United States Patent Office 2,941,884
Patented June 21, 1960

2,941,884
ANIMAL FEEDS, ANIMAL FEED SUPPLEMENTS, AND METHODS
John Alfred Aeschlimann and Benjamin Tabenkin, Montclair, N.J., assignors to Hoffmann-La Roche Inc., Nutley, N.J., a corporation of New Jersey
No Drawing. Filed Oct. 9, 1957, Ser. No. 689,059
9 Claims. (Cl. 99—2)

This invention relates to new and useful improvements in feeds for animals and in methods of feeding animals. More particularly, the invention relates to animal feed compositions containing a hypoglycemic sulfonylurea; to feed supplements containing a hypoglycemic sulfonylurea, which can be admixed with conventional animal feeds or conventional basal rations for animals or nutrients or other diluent materials suitable for oral ingestion by animals, such feed supplements thus being useful also to prepare the animal feed compositions of the invention; and to improved methods of growing animals by feeding them the animal feed compositions or feed supplements of the invention.

By "hypoglycemic sulfonylurea" is meant a compound containing a sulfonylurea linkage

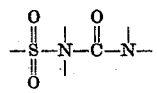

as a constituent part of its molecular structure and capable, after ingestion by the animal, of causing a decrease in the content of glucose in the blood. Hypoglycemic sulfonylureas as so defined are well known to those skilled in the art. Several species of this class, e.g. tolbutamide and carbutamide, have been investigated in clinical researches relating to human therapy. The preparation of this class of compounds is well known to those skilled in the art; general methods being taught, for instance, in the following German patent applications which have been laid open to the public for inspection:

| Serial No. | Filed | Opened |
|---|---|---|
| F18136 IVb/12o, 17/03 | 8- 8-55 | 9-27-56 |
| F18339 IVb/12o, 17/03 | 9- 3-55 | 12-27-56 |
| F18648 IVb/12o, 17/03 | 10-14-55 | 12-13-56 |
| F18659 IVb/12o, 17/03 | 10-15-55 | 12-27-56 |
| F19253 IVb/12o, 17/03 | 1- 7-56 | 3- 7-57 |
| B38071 IVb/12o, 17/03 (German "Auslegeschrift" 1011413) | 11-28-55 | 7- 4-57 |

Among the preferred hypoglycemic sulfonylureas are hypoglycemic phenylsulfonylureas having the formula

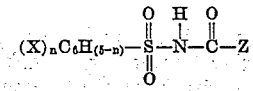

wherein X represents a monovalent radical selected from the group consisting of lower alkyl, lower alkoxy and halogen; Z represents a monovalent radical selected from the group consisting of monovalent secondary and tertiary organic amino radicals, and $n$ represents a small natural number.

Illustrative meanings of the symbol X in the above formula are: methyl, ethyl, isopropyl, methoxy, chlorine, bromine, and the like. Illustrative values of the symbol $n$ in the above formula are: 0, 1 and 2. Illustrative meanings of the symbol Z in the above formula are: ethylamino, isopropylamino, n-butylamino, 2,2-dimethylpropylamino, n-hexylamino, 4-heptylamino, 1-octylamino, allylamino, crotylamino, cyclopentylamino, cyclohexylamino, cycloheptylamino, p-methylcyclohexylamino, cyclohexylmethylamino, α-cyclohexenylamino, methoxypropylamino, n-propoxypropylamino, β-ethoxyethylamino, tetrahydrofurfurylamino, 2-propyl-1,3-dioxan-5-amino, γ-ethylmercapto-n-propylamino, neobornylamino, and the like.

The following are exemplary of phenylsulfonylureas that can be employed in the practice of the invention:

1-n-butyl-3-phenylsulfonylurea
1-n-butyl-3-p-tolylsulfonylurea
1-tert.-butyl-3-p-tolylsulfonylurea
1-n-hexyl-3-m-methoxyphenylsulfonylurea
1-n-propyl-3-p-isopropylphenylsulfonylurea
1-n-hexyl-3-m-tolylsulfonylurea
1-allyl-3-p-tolylsulfonylurea
1-isoamyl-3-p-tolylsulfonylurea
1-cyclohexyl-3-p-tolylsulfonylurea
1-cylohexyl-3-p-ethylphenylsulfonylurea
1-n-butyl-3-m-chlorophenylsulfonylurea
1-n-butyl-3-p-bromophenylsulfonylurea
1-cyclohexyl-3-p-chlorophenylsulfonylurea
1-isobutyl-3-(3-chloro-4-methylphenylsulfonyl)urea
1-cyclohexyl-3-(2,4-dimethylphenylsulfonyl)urea
1-isobutyl-3-(3,4-dimethoxyphenylsulfonyl)urea
1-(3-ethoxy-n-propyl)-3-p-tolylsulfonylurea
1-tetrahydrofurfuryl-3-p-tolylsulfonylurea
1-β-isopropoxyethyl-3-p-tolylsulfonylurea
1-α-pyridyl-3-p-tolylsulfonylurea
1-(4-methyl-2-pyridyl)-3-p-tolylsulfonylurea
1-(3-methylmercapto-n-propyl)-3-p-tolylsulfonylurea
1-isopropoxyethyl-3-phenylsulfonylurea.

Each of the above listed compounds is specifically disclosed in the published German patent applications previously listed herein.

Additional examples of hypoglycemic sulfonylureas which can be employed in practicing the invention are:

1-d-(+)-bornyl-3-phenylsulfonylurea
1-d-(+)-bornyl-3-p-tolylsulfonylurea
1-d-(−)-neobornyl-3-p-tolylsulfonylurea
1-fenchyl-3-phenylsulfonylurea Each of the above listed compounds is specifically disclosed in a copending application of John Alfred Aeschlimann and Arthur Stempel, Serial No. 687,373, filed October 1, 1957, entitled "Substituted Ureas."

Whereas numerous examples of hypoglycemic sulfonylureas, useful in practicing the present invention, have been referred to above, it should be understood that no hypoglycemic sulfonylurea is claimed herein as a novel compound, nor is the preparation of any hypoglycemic sulfonylurea claimed herein as a novel method.

The animal feed compositions of the invention can be made by mixing a hypoglycemic sulfonylurea compound with conventional ingredients of animal feeds. The mixing can be accomplished by methods known per se. A convenient method of making the improved animal feeds of the invention comprises charging conventional feed ingredients and a hypoglycemic sulfonylurea to a batch mixer and operating the mixer until the contents thereof are uniformly dispersed to give a mixture which is homogeneous throughout. An alternative method of preparing animal feeds according to the invention comprises adding a hypoglycemic sulfonylurea feed supplement to a conventional animal feed. Thus, it will often be convenient to premix the hypoglycemic sulfonylurea compound with a diluent which is suitable for oral ingestion by the animal (this diluent may itself be a nutrient material for the animal) and subsequently to mix the premixed supplement so obtained with a commercially obtainable conventional animal feed material, so as to obtain the improved animal feed compositions of the invention. As another alternative, a hypoglycemic sulfonylurea compound may be intimately admixed with such a material as corn meal or soy bean oil meal to give a uniformly blended composition, and the hypoglycemic sulfonylurea feed supplement composition so obtained may be subsequently mixed with additional nutrient ingredients suitable to make a finished improved feed according to the invention. Preferably, the hypoglycemic sulfonylurea compound is employed in an amount that will give a finished animal feed having a proportion of from about 0.001% to about 0.1%, by weight, of hypoglycemic sulfonylurea compound; but it will be understood that the invention embraces the use of any proportion of hypoglycemic sulfonylurea compound that will give beneficial and economically desirable results in the utilization by the animal of its feed. An especially preferred proportion of hypoglycemic sulfonylurea compound in the feed is from about 0.005% to about 0.05% by weight.

The novel methods of the invention, whereby a hypoglycemic sulfonylurea compound is made a part of the animal's diet, can be practiced by feeding growing animals on complete animal feed rations, improved by incorporation of a hypoglycemic sulfonylurea therein according to the present invention. Alternatively, it may be desirable in some cases to feed the animal a hypoglycemic sulfonylureau feed composition which contains less nutrient material than is found in the animal's total diet. For example, the animal can be fed alternately on conventional rations and on hypoglycemic sulfonylurea feed compositions of the invention. Or, the hypoglycemic sulfonylurea compound can be dissolved in the animal's drinking water and can be furnished to the animal in this way.

Preferred aspects of the invention relate to swine feed compositions comprising swine nutrients and hypoglycemic sulfonylureas, and to methods of growing swine by feeding them such compositions. It has been found that swine grown on animal feed compositions comprising conventional rations and, in addition, a hypoglycemic compound consume feed with greater efficiency. That is to say, it takes less feed, when employing the swine feed compositions of the present invention, to procure a desired gain in weight of the swine than when employing conventional swine feed compositions. Additionally, it has been observed that swine grown on hypoglycemic sulfonylurea feed compositions of the invention, when butchered, have leaner carcasses than when grown on conventional feed compositions, and the carcasses contain a greater percentage of primal cuts.

The following examples are illustrative, but not limitative, of the invention.

*Example 1*

(A) A basal chick starter mash was made by mixing the following ingredients:

| | Weight (lbs.) |
|---|---|
| Wheat middlings | 400 |
| Yellow corn meal | 1268.5 |
| Fine ground oats | 200 |
| Alfalfa meal | 100 |
| Soy bean oil meal | 400 |
| Meat scraps | 200 |
| Fish meal | 90 |
| Dried corn distiller's solubles | 120 |
| Dried whey | 100 |
| Dried skim milk | 30 |
| Riboflavin supplement (containing per pound 227 mg. of riboflavin) | 12 |
| Ground limestone | 30 |
| Dicalcium phosphate | 30 |
| Iodized salt | 10 |
| Trace minerals [1] | 1.5 |

[1] Content, in p.p.m. per ton of feed:

| | |
|---|---|
| Manganese | 65.00 |
| Cobalt | 0.75 |
| Copper | 1.50 |
| Iodine | 1.50 |
| Iron | 30.00 |
| Zinc | 1.30 |
| Boron | 0.39 |

| | Weight (lbs.) |
|---|---|
| Vitamin A and D feeding oil (containing per pound 1,020,000 U.S.P. vitamin A units and 136,000 U.S.P. units of vitamin D) | 6 |
| D-activated animal sterol (containing per pound 1,360,000 U.S.P. vitamin D units) | 2 |
| Total (approx. 20% protein, 3.5% fat, 5% fiber) | 3000.0 |

(B) 5 g. of 1-n-butyl-3-p-tolylsulfonylurea was mixed with 500 g. of the chick starter mash described in Example 1(A) above, until a uniformly blended mixture was obtained. The entire amount of this premixed feed supplement was then uniformly blended with 4500 g. of the same chick starter mash.

(C) 0.5 g. of 1-tert.-butyl-3-phenylsulfonylurea was mixed with 50 g. of yellow corn meal until a uniformly blended mixture was obtained. The supplement so obtained was then mixed with 5000 g. of the chick starter mash described in Example 1(A) above until a uniformly blended mixture was obtained.

(D) One-fourth pound of 1-n-butyl-3-phenylsulfonylurea was premixed with one pound of soy bean oil meal until a uniformly blended mixture was obtained. The premixed supplement thus prepared was then mixed with 500 pounds of the chick starter mash described in Example 1(A) above, until a uniformly blended mixture was obtained.

*Example 2*

(A) A basal ration for pigs was made up by mixing the following ingredients in a batch feed mixer:

| | Weight (lbs.) |
|---|---|
| Corn | 325.0 |
| Soy bean oil meal | 60.5 |
| Meat scraps | 22.0 |
| Alfalfa hay | 25.0 |
| Salt | 2.5 |
| Antibiotic feed supplement (containing per pound 3.6 g. of chlortetracycline) | 2.5 |
| Glucose | 60.5 |
| Dicalcium phosphate | 2.0 |
| B vitamin feed supplement (containing per pound 2 g. of riboflavin, 4 g. of pantothenic acid, 9 g. of niacin, 10 g. of choline chloride and 60 mg. of folic acid) | 0.25 |
| Dry vitamin A (containing per pound 9,080,000 U.S.P. vitamin A units) | 0.1 |
| D-activated animal sterol (containing per pound 1,360,000 U.S.P. vitamin D units) | 1.5 |
| Total (approx. 14% protein) | 501.85 |

(B) A hypoglycemic sulfonylurea ration for pigs was made up by mixing together, in a uniform blend, 25 g. of 1-n-butyl-3-p-tolylsulfonylurea together with all of the ingredients listed in Example 2(A) above, in the quantities there listed.

(C) A second hypoglycemic sulfonylurea swine feed was made by blending together uniformly 25 g. of 1-cyclohexyl-3-p-tolylsulfonylurea and all of the ingredients listed in Example 2(A) above, in the quantities there listed.

*Example 3*

Seventeen pigs weighing about 100 pounds each were divided into three groups, the first group containing five pigs, and the second and third groups each containing six pigs. The pigs in group 1 were fed on the ration described in Example 2(A). Those in group 2 were fed on the ration described in Example 2(B). Those in group 3 were fed on the ration described in Example 2(C). The pigs were slaughtered as they reached market weight, approximately 200 pounds. The following table lists the significant observations:

|  | Group 1 | Group 2 | Group 3 |
|---|---|---|---|
| No. pigs | 5 | 6 | 6 |
| Slaughter weight (lbs.) | 205.6 | 203.7 | 209.2 |
| Daily gain (lbs.) | 1.53 | 1.56 | 1.53 |
| Feed per cwt. gain (lbs.) | 401.4 | 353.3 | 379.4 |
| Warm dressing percent | 82.78 | 81.60 | 81.60 |
| Carcass length (cm.) | 73.8 | 74.0 | 75.4 |
| Leg length (cm.) | 50.9 | 51.5 | 51.7 |
| Ham length (cm.) | 34.7 | 35.4 | 35.5 |
| Carcass depth (cm.) | 35.7 | 35.3 | 35.8 |
| Carcass thickness (cm.) | 27.4 | 27.0 | 27.3 |
| Mean backfat thickness (in.) | 1.58 | 1.41 | 1.49 |
| Percent primal cuts of live wt.[1] | 47.47 | 48.48 | 47.95 |
| Area of loin eye (sq. in.) | 4.26 | 3.88 | 3.94 |

[1] Primal cuts—ham, loin, Boston butt, picnic, and bacon side.

We claim:

1. An animal feed composition comprising nutrient material for the animal and a hypoglycemic 1-substituted-3-arylsulfonylurea compound.

2. A method of promoting leanness of carcass in swine which comprises feeding growing swine a composition defined by claim 1.

3. A method of improving the utilization of feed by animals which comprises feeding a hypoglycemic 1-substituted-3-arylsulfonylurea compound to the animals.

4. An animal feed comprising nutrient material and a hypoglycemic phenylsulfonylurea having the formula

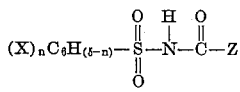

wherein X represents a monovalent radical selected from the group consisting of lower alkyl, lower alkoxy and halogen, Z represents a monovalent radical selected from the group consisting of monovalent secondary and tertiary organic amino radicals, and $n$ represents a small natural number.

5. A supplement for admixture with an animal feed comprising a diluent material suitable for oral ingestion by the animal and, admixed therewith, a hypoglycemic phenylsulfonylurea having the formula defined in claim 4.

6. A swine feed comprising a basal ration for swine and a hypoglycemic phenylsulfonylurea having the formula defined in claim 4.

7. A method of increasing feed efficiency which comprises feeding swine at least in part with a feed defined by claim 6.

8. An improvement in the preparation of a feed for swine which comprises mixing a hypoglycemic 1-substituted-3-arylsulfonylurea compound with a material which is nutrient for swine.

9. An animal feed comprising nutrient material and a hypoglycemic phenylsulfonylurea having the formula

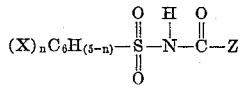

wherein X represents a monovalent radical selected from the group consisting of lower alkyl, lower alkoxy and halogen, Z represents a monovalent radical selected from the group consisting of monovalent secondary and tertiary organic amino radicals, and $n$ represents a small natural number, said hypoglycemic phenylsulfonylurea being present in a proportion of from about 0.001% to about 0.1% by weight of said animal feed.

References Cited in the file of this patent

UNITED STATES PATENTS 2,742,362     Aeschlimann et al.     Apr. 17, 1956

OTHER REFERENCES

Merck Index, 6th Ed. (1952), Rahway, N.J., page 920.

J. A. Ph. A., "Practical Pharmacy Ed." 17, September 1956, page 610.

J.A.M.A. 160, March 1956, page 1089.